US012671767B2

(12) United States Patent (10) Patent No.: US 12,671,767 B2
Wang et al. (45) Date of Patent: Jun. 30, 2026

(54) ROBUST FOREGROUND/BACKGROUND FILTERING CONTROL FOR ACOUSTIC ECHO CANCELLATION

(71) Applicant: DOLBY LABORATORIES LICENSING CORPORATION, San Francisco, CA (US)

(72) Inventors: Ning Wang, Epping (AU); Guodong Li, St. Ives (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 228 days.

(21) Appl. No.: 18/695,218

(22) PCT Filed: Sep. 27, 2022

(86) PCT No.: PCT/US2022/044774
§ 371 (c)(1),
(2) Date: Mar. 25, 2024

(87) PCT Pub. No.: WO2023/055695
PCT Pub. Date: Apr. 6, 2023

(65) Prior Publication Data
US 2025/0159083 A1      May 15, 2025

Related U.S. Application Data

(60) Provisional application No. 63/250,565, filed on Sep. 30, 2021.

(30) Foreign Application Priority Data

Sep. 30, 2021     (EP) ..................................... 21200054

(51) Int. Cl.
*H04M 9/08*         (2006.01)
*H04B 3/23*         (2006.01)

(52) U.S. Cl.
CPC ............ *H04M 9/082* (2013.01); *H04B 3/237* (2013.01)

(58) Field of Classification Search
CPC ............................... H04M 9/082; H04B 3/237
See application file for complete search history.

(56) References Cited

U.S. PATENT DOCUMENTS 4,833,399 A * 5/1989 So ........................... G01R 23/14
324/76.47
5,305,307 A * 4/1994 Chu ......................... H04R 3/02
379/406.05

(Continued)

FOREIGN PATENT DOCUMENTS

RU        2220510 C2      12/2003
RU        2485607 C2      6/2013

OTHER PUBLICATIONS

Christian Schuldt et al: "An Improved Deviation Measure for Two-path Echo Cancellation", Acoustics Speech And Signal Processing (Icassp), 2010 Ieee International Conference On, IEEE, Piscataway, NJ, USA, Mar. 14, 2010 (Mar. 14, 2010), pp. 305-308, 4 pages.

(Continued)

*Primary Examiner* — Lisa Hashem

(57) ABSTRACT

Systems and methods are described for controlling adaptive filtering components. A far end signal may be filtered by each of a foreground filter and a background filter, where both filters are adaptive echo cancellation filters that output echo estimations. Control logic may halt adaptation by the background filter based on a deviation signal. To determine the deviation signal, cross-correlation coefficients for the echo estimations produced by both filters may be determined for each frequency bin of the far end signal. The determined cross-correlation coefficients may be summed across a plurality of the frequency bins. A hysteresis function may then (Continued)

600

605 — DETERMINE NOISE FLOOR VALUES FOR EACH FREQUENCY BIN

610 — DETERMINE CROSS-CORRELATION COEFFICIENTS FOR FOREGROUND AND BACKGROUND ECHO ESTIMATIONS

615 — FILTER CROSS-CORRELATION COEFFICIENTS TO USE DETERMINED VALUES ONLY FOR BINS WITH THRESHOLD LEVEL OF SPEECH

620 — ADD CROSS-CORRELATION COEFFICIENTS ACROSS PLURALITY OF FREQUENCY BINS

630 — SELECT SUM OF CORRELATION COEFFICIENTS ASSOCIATED WITH ECHO ESTIMATIONS SELECTED FOR CURRENT FRAME FILTERED RESULT

640 — APPLY HYSTERESIS FUNCTION TO SELECTED SUM TO DETERMINE DEVIATION SIGNAL be applied to the sum associated with the filter associated with the echo estimation used to generate a filtered result. The deviation signal may be activated in response to the hysteresis function outputting a high value, which the control logic uses to turn off adaptation by the background filter.

20 Claims, 5 Drawing Sheets

(56) References Cited

U.S. PATENT DOCUMENTS

| | | | | |
|---|---|---|---|---|
| 6,622,030 | B1 * | 9/2003 | Romesburg | H04M 9/082 |
| | | | | 379/406.01 |
| 7,177,416 | B1 * | 2/2007 | Zhang | H04M 9/082 |
| | | | | 379/406.05 |
| 8,019,075 | B2 | 9/2011 | Mohammad | |
| 8,023,641 | B2 | 9/2011 | Rahbar | |
| 8,462,958 | B2 * | 6/2013 | Kuech | G10L 21/0208 |
| | | | | 379/406.01 |
| 8,644,522 | B2 * | 2/2014 | LeBlanc | H04M 9/082 |
| | | | | 381/94.1 |
| 8,693,678 | B2 * | 4/2014 | Lindstrom | H04M 9/082 |
| | | | | 379/406.02 |
| 8,712,076 | B2 | 4/2014 | Dickins | |
| 8,787,561 | B2 | 7/2014 | Dyba | |
| 8,934,620 | B2 | 1/2015 | Rowley | |
| 9,036,816 | B1 | 5/2015 | Ayrapetian | |
| 9,549,079 | B2 * | 1/2017 | Bao | H04M 9/082 |
| 9,602,922 | B1 * | 3/2017 | Yang | H04B 3/237 |
| 9,842,606 | B2 | 12/2017 | Ushakov | |
| 9,972,337 | B2 * | 5/2018 | Li | G10L 25/06 |
| 10,192,567 | B1 | 1/2019 | Kamdar | |
| 10,313,509 | B2 * | 6/2019 | Gunther | H04B 3/237 |
| 10,477,031 | B2 | 11/2019 | Schalk-Schupp | |
| 10,601,998 | B2 * | 3/2020 | Hera | H04M 9/082 |
| 11,100,942 | B2 * | 8/2021 | Dickins | G10L 25/21 |
| 11,863,710 | B2 * | 1/2024 | Lei | H04M 9/082 |
| 12,231,603 | B2 * | 2/2025 | Wang | H04M 9/082 |
| 2013/0156211 | A1 | 6/2013 | Hwang | |
| 2017/0142532 | A1 | 5/2017 | Pan | |
| 2019/0394338 | A1 | 12/2019 | Wada | |
| 2020/0228663 | A1 | 7/2020 | Wells-Rutherford | |
| 2023/0115316 | A1 * | 4/2023 | Wang | H04B 3/234 |
| | | | | 379/406.01 |
| 2025/0159083 | A1 * | 5/2025 | Wang | H04M 9/082 |

OTHER PUBLICATIONS

Ghose, K. and Reddy, V.U.,A Double-talk Detector for Acoustic Echo Cancellation Applications. Signal Processing, 80 (8), pp. 1459-1467. 9 pages.

Marc Moonen et al., Transform Domain Prediction Error Method for Improved Acoustic Echo and Feedback Cancellation, 20th European Signal Processing Conference (EUSIPCO 2012) Bucharest, Romania, Aug. 27-31, 2012, 5 pages.

Vineeta Das et al., A New Cross Correlation Based Double Talk Detection Algorithm for Nonlinear Acoustic Echo Cancellation, IEEE Xplore, 6 pages.

Y. Zhou et al., Advanced Double-talk Detection Algorithm Based on Joint Signal Energy and Cross-correlation Estimation, 2016 8th IEEE International Conference on Communication Software and Networks, 4 pages.

* cited by examiner

100

110 — FILTER FAR END SIGNAL VIA FOREGROUND FILTER TO DETERMINE FOREGROUND ECHO ESTIMATION

120 — FILTER FAR END SIGNAL VIA BACKGROUND ADAPTIVE FILTER TO DETERMINE BACKGROUND ECHO ESTIMATION

130 — DETERMINE FILTERED RESULT BASED ON SELECTED ONE OF FOREGROUND AND BACKGROUND ECHO ESTIMATIONS

140 — HALT ADAPTATION OF BACKGROUND FILTER BASED ON DETERMINED DEVIATION SIGNAL

550

555

$Y_i[k]$

560

NOISE ESTIMATOR

SNR

565

570

$f$

585

$\rho_i[k]$

580

$\hat{X}_i[k]$

575

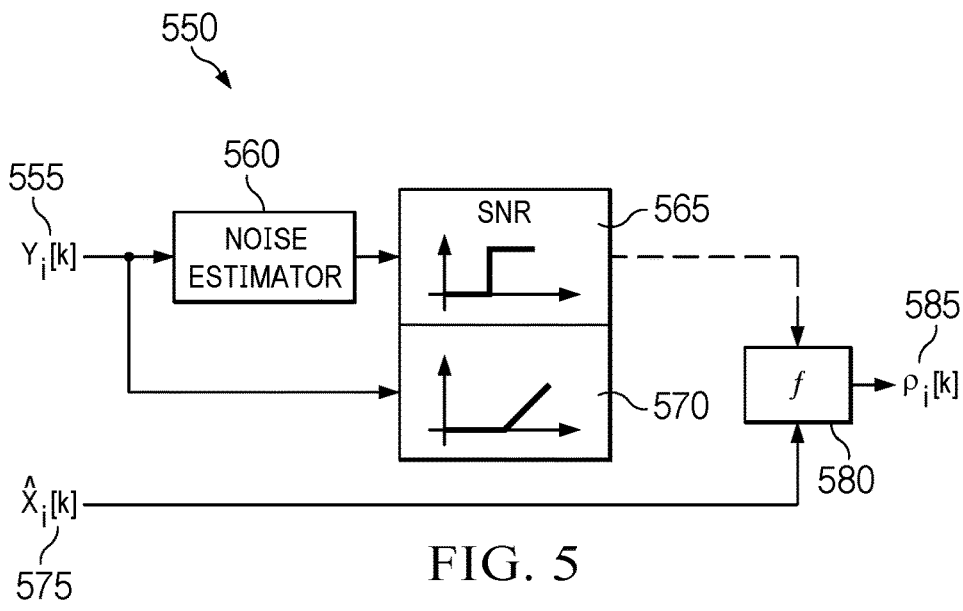

605 — DETERMINE NOISE FLOOR VALUES FOR EACH FREQUENCY BIN

610 — DETERMINE CROSS-CORRELATION COEFFICIENTS FOR FOREGROUND AND BACKGROUND ECHO ESTIMATIONS

615 — FILTER CROSS-CORRELATION COEFFICIENTS TO USE DETERMINED VALUES ONLY FOR BINS WITH THRESHOLD LEVEL OF SPEECH

620 — ADD CROSS-CORRELATION COEFFICIENTS ACROSS PLURALITY OF FREQUENCY BINS

630 — SELECT SUM OF CORRELATION COEFFICIENTS ASSOCIATED WITH ECHO ESTIMATIONS SELECTED FOR CURRENT FRAME FILTERED RESULT

640 — APPLY HYSTERESIS FUNCTION TO SELECTED SUM TO DETERMINE DEVIATION SIGNAL

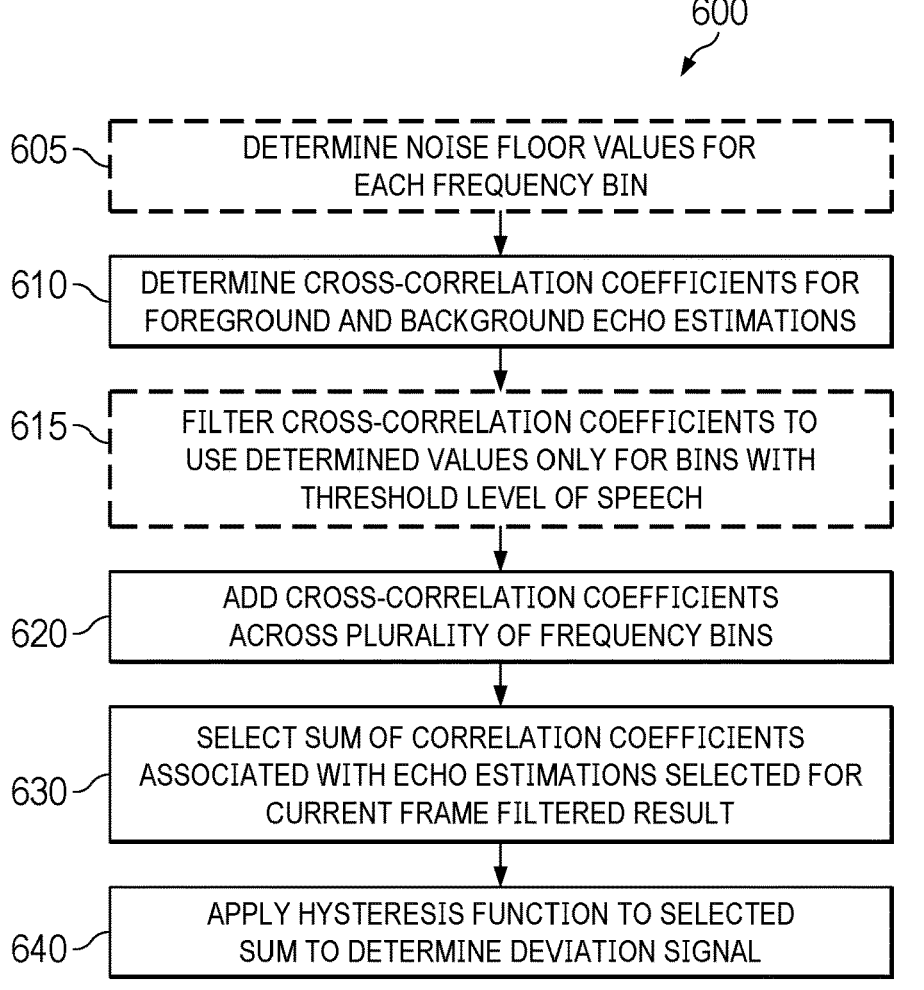

$X_i[k]$    $H_i[k]$    $\hat{X}_i[k]$    CROSS CORRELATION ESTIMATOR    730 → $P_i[k]$ $-$ $Y_i[k]$

715

800

818    830    820

$810 \sim \sum\limits_{i=i_0}^{i_1} P_i[k]$

0    $th_0$    $th_1$ $840 \sim I[k]$    1

845    855

0

ROBUST FOREGROUND/BACKGROUND FILTERING CONTROL FOR ACOUSTIC ECHO CANCELLATION

CROSS-REFERENCE TO RELATED APPLICATIONS

This application is the U.S. national stage entry of international Patent Application No. PCT/US2022/044774 filed Sep. 27, 2022, which claims priority of U.S. Provisional Application No. 63/250,565, filed Sep. 30, 2021 and European Patent Application No. 21200054.1, filed Sep. 30, 2021, which are hereby incorporated by reference.

TECHNICAL FIELD

Embodiments herein relate generally to audio signal processing, and more specifically to controlling filtering for acoustic echo cancellation to respond to different filter deviations in a more robust way compared to conventional solutions.

SUMMARY OF THE INVENTION

Systems and methods are described for controlling foreground and background adaptive filtering components of an acoustic echo cancelling system. A foreground filter of the acoustic echo canceling system may be in communication with control logic and filters a received frequency-domain far end signal to result in a foreground echo estimation. The foreground filter may be an adaptive echo cancellation filter that operates based on foreground coefficients. The acoustic echo canceling system may also include a background filter that filters the received frequency-domain far end signal. The background filter may be an adaptive echo cancellation filter that operates based on background coefficients and outputs a background echo estimation.

The control logic, in communication with both the foreground filter and the background filter, may determine a filtered result based on a near-end microphone signal and a selected one of the foreground echo estimation and the background echo estimation. The filtered result may be subsequently used to generate a near-end voice signal for the acoustic echo canceling system. The control logic may halt adaptation by the background filter based on a deviation signal. The deviation signal may be determined by the control logic by determining cross-correlation coefficients for both the foreground echo estimation and the background echo estimation for each frequency bin of the received frequency-domain far end signal. Each cross-correlation coefficient may be based on a comparison of received microphone input signals and the respective echo estimations by the filters for each frequency bin. The determined cross-correlation coefficients may be added across a plurality of the frequency bins for both the foreground echo estimation and the background echo estimation, and one of the sum of the cross-correlation coefficients for the foreground echo estimation and the sum of the cross-correlation coefficients for the background echo estimation may be selected based on which filter is associated with the selected one of the echo estimations. Finally. a hysteresis function may be applied to the selected sum of cross-correlation coefficients. When the selected sum is greater than a first threshold, the hysteresis function may output a high value, and when the selected sum is less than a second threshold, the hysteresis function may output a low value. The deviation signal being activated by the control logic in response to the hysteresis function outputting the high value, which the control logic uses to turn off adaptation of the background filter.

BRIEF DESCRIPTION OF THE FIGURES

This disclosure is illustrated by way of example and not limitation in the figures of the accompanying drawings, in which like references indicate similar elements, and in which:

FIG. 5 shows a simplified block diagram of system for determining correlation coefficients for a deviation signal, according to various embodiments.

FIG. 6 shows a flow diagram for a method of determining a deviation signal, according to an embodiment.

DETAILED DESCRIPTION

A foreground/background filtering scheme is conventionally used for acoustic echo cancellation in audio conferencing systems. One benefit of the foreground/background filtering scheme is its ability to address the dead-lock problem: handling two very similar filter deviations for echo path changing and double talk very differently. For an echo path change, it is desirable that the filter adapt as quickly as possible. By contrast, for double talk, it would be better for the adaption to be minimal. The control logic of determining when to transfer the adaptive filter coefficients between foreground and background filter may accordingly be important to the overall performance of the acoustic echo canceller (AEC). Furthermore, the accuracy of control logic, thus the AEC performance, may be adversely affected by the noise level in the microphone environment. Accordingly, a robust algorithm would be desirable for the control logic to work properly under different operation environments.

Figure 1:
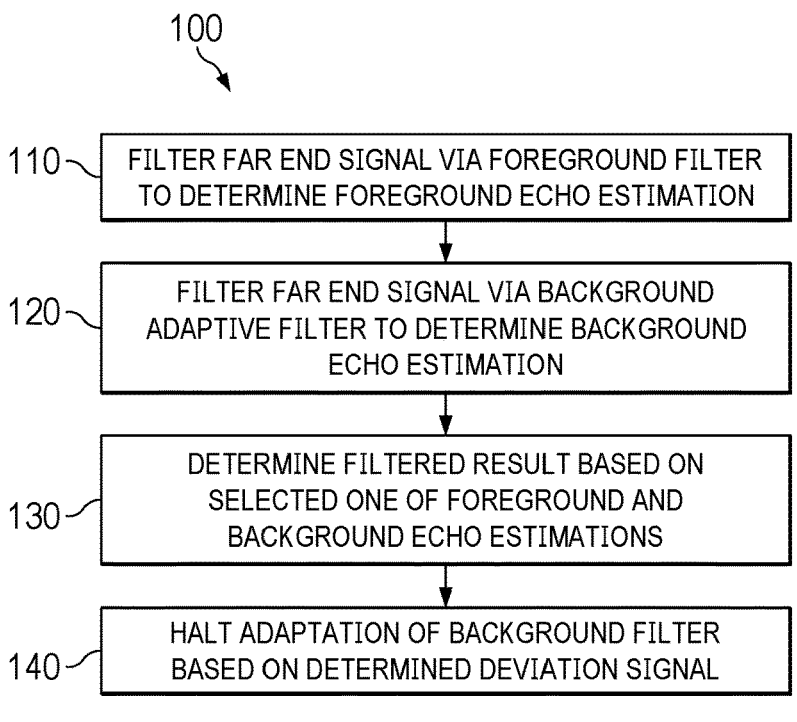
FIG. 1 shows a flow diagram for a method for controlling foreground and background adaptive filtering components of an acoustic echo cancelling system, according to an embodiment.
Figure 2:
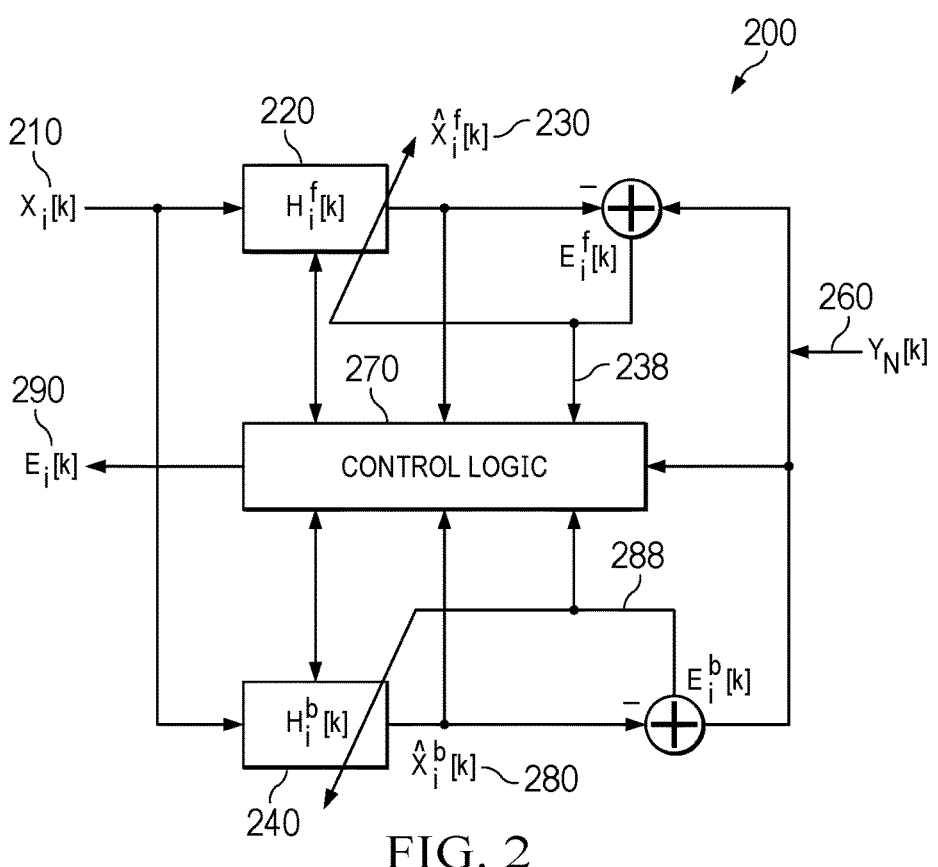
FIG. 2 shows a simplified block diagram of a system for controlling foreground and background adaptive filtering components of an acoustic echo cancelling system, according to an embodiment.

Novel and robust systems and methods are described herein for control logic for a foreground/background filtering scheme that can widely be used in the foreground/background adaptive filtering applications. FIG. 1 shows a flow diagram for a method 100 for controlling foreground and background adaptive filtering components of an acoustic echo cancelling system, according to an embodiment. FIG. 2 shows a simplified block diagram of a system 200 for controlling foreground and background adaptive filtering components of an acoustic echo cancelling system, according to an embodiment, using the method 100 described in FIG. 1. System 200 may be a portion of a larger system used for acoustic echo cancellation. The exemplary system 200 includes a foreground adaptive filter 220, a background adaptive filter 240, and control logic 270 in communication with each of the foreground filter and the background filter. Signal $X_i[k]$ 210 refers to the frequency-domain far end signal, derived from time domain samples of a far end signal $x[t]$ to be played back by the near-end device. Similarly, signal $Y_i[k]$ 260 is the frequency-domain near end microphone capture signal, derived from time domain samples of the near end microphone capture signal $y[t]$. The microphone capture signal $y[t]$ may be determined from the far end signal $x[t]$ when near end speech is not present using the following expression:

$$y[t] = h[t] * x[t] + n(t),$$

where $h[t]$ is the speaker-room-microphone impulse response. and $n[t]$ is the additive noise (which could be ambient acoustic noise or electronic noise introduced by the circuits). To convert $x[t]$ and $y[t]$ to the frequency domain, they may pass through a filter bank (not shown) or be processed using a short time Fourier transform ("STFT"). The expressions $X_i[k]$, $Y_i[k]$ and $N_i[i]$ are accordingly used herein to represent the i-th bin data of $x[t]$ $y[t]$ and $n[t]$ for frame k.

The method 100 may start at step 110, where foreground filter 220 of the acoustic echo canceling system 200 may filter the received frequency-domain far end signal $X_i[k]$ 210 to result in a foreground echo estimation $$\hat{X}_i^f[k]$$

230. The foreground filter 220 may be an adaptive echo cancellation filter that operates based on foreground coefficients, which are adapted based on differences between the estimated echo estimation $$\hat{X}_i^f[k]$$

230 and captured microphone signal $Y_i[k]$ 260. At step 120, the background filter 240 filters the received frequency-domain far end signal $X_i[k]$ 210 to result in a background echo estimation $$\hat{X}_i^b[k]$$

280. The background filter 240 may also be an adaptive echo cancellation filter, that operates based on background coefficients which are adapted similarly to the foreground coefficients (i.e. based on differences between the estimated echo estimation $$\hat{X}_i^b[k]$$

280 and the captured microphone signal $Y_i[k]$ 260).

The control logic 270, in communication with both the foreground filter 220 and the background filter 240, may determine a filtered result $E_i[k]$ 290 at step 130 based on the received frequency-domain far end signal $X_i[k]$ 210 and a selected one of the foreground echo estimation $$\hat{X}_i^f[k]$$

230 and the background echo estimation $$\hat{X}_i^b[k]$$

280. As seen in acoustic echo canceling system 200, for each bin i, $$E_i^f[k]$$

238 and $$E_i^b[k]$$

288 are the residual (error per bin) of the foreground and background filter respectively. To obtain the residual $$E_i^f[k]$$

238, the determined foreground echo estimation $$\hat{X}_i^f[k]$$

230 is subtracted from the frequency-domain near end microphone capture signal $Y_i[k]$ 260. Residual $$E_i^f[k]$$

238 may then be passed to the control logic 270. Likewise, to obtain the residual $$E_i^b[k]$$

288, the determined foreground echo estimation $$\hat{X}_i^b[k]$$

280 is subtracted from the frequency-domain near end microphone capture signal $Y_i[k]$ 260.

The control logic 270 may select one of residual $$E_i^f[k]$$

238 and residual $$E_i^b[k]$$

288 to be filtered result $E_i[k]$ 290. The filtered result $E_i[k]$ 290 may be subsequently used to generate a near-end voice signal (e.g., to be transmitted across a network for playback at a remote location) and/or converted to a time domain signal. When near end speech is present, the filtered result $E_i[k]$ 290 may include both the echo residual and the near end speech. The selection can be initialized at the beginning of the echo cancellation process by using the foreground residual $$E_i^f[k]$$

238. After initialization, control logic 270 may continue to select the residual used in the previous frame in scenarios where the residuals from the two filters are close in value. When there is a significant difference (e.g., beyond a predetermined threshold), different logic may be used, as described in greater detail below.

Typically a variant of least mean square ("LMS") algorithm may be implemented as the adaptive filter update scheme (e.g. NLMS, NAG-LMS, PNLMS). At a high level, the control logic 270 may control the adaptation of the foreground adaptive filter 220 and the background adaptive filter 240 as follows:

The updating step size of the foreground adaptive filter 220 LMS adaptation algorithm may be relatively large, and may continuously update for each frame.

The updating step size of background adaptive filter 240 LMS adaptation algorithm may be relatively small, e.g., one or two order of magnitude smaller than the foreground filter 220 LMS adaptation algorithm.

If control logic 270 finds that an aggregation of the residual (error) signal $$E_i^f[k]$$

238 of foreground filter 220 across all frequency bins is significantly larger (e.g., greater than a predetermined threshold, such as 6 dB, for example) than a similar aggregation of the residual signal $$E_i^b[k]$$

288 of the background filter 240 for a threshold number of consecutive frames (which may be a predetermined number, such as two or more frames, for example), the coefficients of background filter 240 may be copied to the coefficients of the foreground filter 220 (the momentums are also copied if using NAG-LMS). This is because the control logic 270 is identifying the situation as being caused by near end speech within y[t] (e.g., double talk in a teleconference, where a speaker is speaking at the near end at the same time as the far end signal is being replayed).

However, if the control logic 270 finds that aggregation of the residual signal $$E_i^b[k]$$

288 of the background filter 240 across all frequency bins is significantly larger than the aggregation of the residual (error) signal $$E_i^f[k]$$

238 of foreground filter 220 across all frequency bins for a predetermined consecutive number frames (any plurality may be selected, though 3-5 frames may be desirable), the coefficients of background filter 240 may be replaced by the foreground filter coefficients. This is due to the control logic 270 identifying when the foreground and background filters start to converge, or when the echo path changes (e.g., when there is an obstruction between a speaker of the near-end audio system and the near-end microphone, such as a user covering a part of the near-end microphone).

Returning to method 100 of FIG. 1, to further improve the performance of AEC, the background filter 240 may be frozen (i.e. the adaptation may be halted) whenever a deviation signal I[k] is being signaled by the control logic 270 at step 140. A deviation signal I[k] may be derived to reflect when there is a significant divergence between the adapted filter (either foreground or background) and the real speaker-room-mic response h[t]. According to the exemplary embodiment, the deviation signal may be based on cross-correlation coefficients determined between the captured microphone signal $Y_i[k]$ and the determined echo estimations $\hat{X}_i[k]$ of the adaptive filters. Additional information on cross-correlation coefficients may be found in Ghose, K. and Reddy, V. U., 2000, *A Double-Talk Detector for Acoustic Echo Cancellation Applications*, Signal Processing, 80(8), pp. 1459-1467, hereby incorporated by reference.

Figure 3:
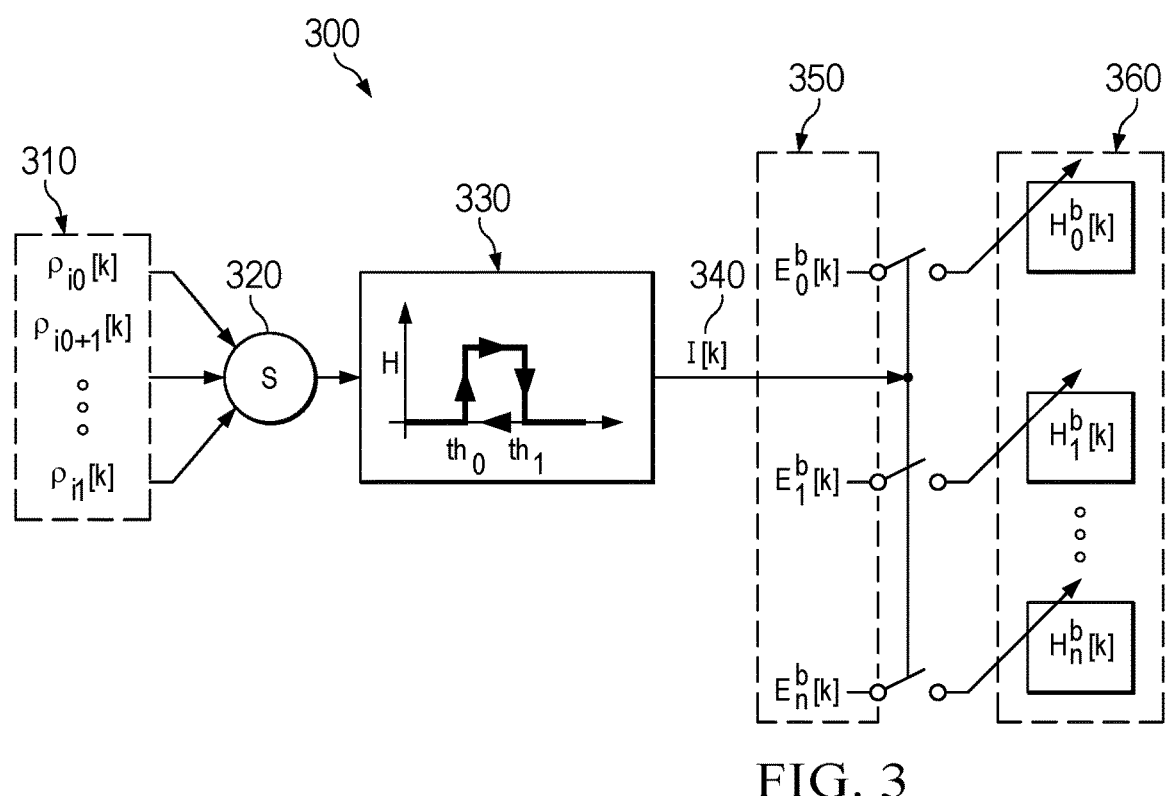
FIG. 3 shows a simplified block diagram of an acoustic echo cancelling system utilizing a deviation signal to halt adaptation of a background filter, according to an embodiment.

One possible expression for determining a deviation signal may be:

$$I[k] = H\left(\sum_{i=i_0}^{i_1} \rho_i[k]\right),$$

where $\rho_i[k]$ is the cross-correlation coefficient of the i-th bin of frame k. From bins $i_0$ to $i_1$, these cross-correlation coefficients may be accumulated to get the deviation signal. In some embodiments, these bins cover the majority of the voice bandwidth, e.g. 300 Hz to 3400 Hz, and H may be a binary hysteresis function (explained further below, with reference to the discussion of FIG. 8). FIG. 3 illustrates the above equation in exemplary block diagram 300. Operation 320 sums each of the cross-correlation coefficients $\rho_i[k]$ 310 for all the bins of frame k of the filter associated with the selected echo estimation for the current frame (as described above). Hysteresis function H is applied to the selected aggregation of the cross-correlation coefficients $\rho_i[k]$ 310 to output deviation signal I[k] 340. As shown in FIG. 3, the deviation signal I[k] 340 is a control signal for the control logic to halt adaptation of background filter 360, thereby freezing the values of the background coefficients used to generate residual signals $$E_i^b[k]$$

350 until the deviation signal I[k] 340 goes low.

When an adaptive filter converges, and when there is neither local speech presented on microphone input y[t] nor any echo path changes, the estimation signal should correlate the input quite closely. Geometrically, it means the angle between signal y[t] and $\hat{x}$[t] will be small. On the other hand, whenever there is some local speech presented (e.g., double talk) or a change in echo path, the cross-correlation between signal y[t] and $\hat{x}$[t] will drop, reflecting an increase in the angle between them.

Figure 4:
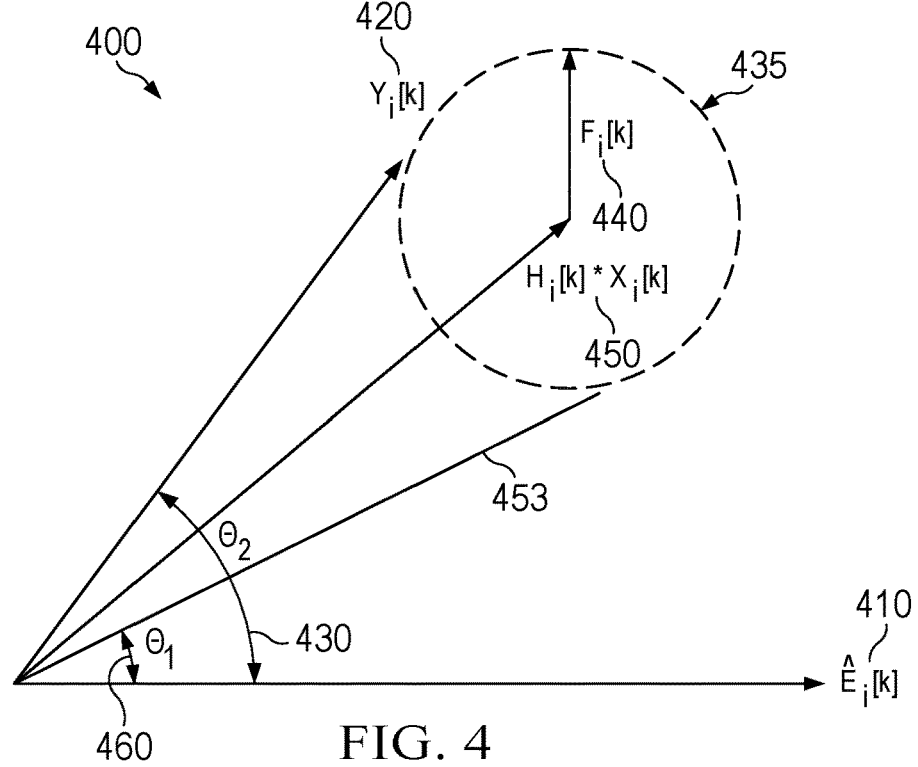
FIG. 4 shows a plot illustrating how a noise estimate may improve the ability of the estimation signal to track the microphone input, based on an embodiment.

Accordingly, to increase the robustness of $\rho_i[k]$ under different noise environments, noise floor values for each frequency bin may be determined. FIG. 4 shows how the noise level can greatly reduce the credibility of the echo estimation of a filter, undermining filter performance. FIG. 4 is a plot 400 illustrating how a noise estimate may improve the ability of the estimation signal to track the microphone input, based on an embodiment. How noisy the deviation angle estimation (the variation between $\theta_1$ and $\theta_2$) is can pretty much be defined by the SNR level (the length of $Y_i[k]$ 420 divided by the radius 440 of the noise power $F_i[k]$ 435). In plot 400, H $$H_i^0$$

450 represents the speaker-room-microphone response on bin i. The greater the noise power $F_i[k]$ 435, the larger angle $\theta_2$ will be between the captured microphone signal $Y_i[k]$ 420 and the residual signal after echo removal $\hat{E}_i[k]$ 410 will be (and accordingly, the less effecting the echo cancellation will be). Using a noise floor estimate can improve the attributes of the angle, which indicates how large the deviation is between the input signal $Y_i[k]$ 420 and the estimated echo signal $\hat{E}_i[k]$ 410. For example, when generating a sum of correlation coefficients, only using the bins with noise power $F_i[k]$ 435 small enough (relative to the magnitude to $Y_i[k]$ 420) can reduce the deviation between the input signal $Y_i[k]$ 420 and the estimated echo signal $\hat{E}_i[k]$ 410.

The noise floor estimation is displayed in FIG. 5. FIG. 5 shows a simplified block diagram 550 of determining correlation coefficients $\rho_i[k]$ 585 for a deviation signal, according to various embodiments. To enhance its robustness, for each bin, $Y_i[k]$ 555 may be processed by noise estimator 560 to capture the noise floor of bin i. Notice $Y_i[k]$ could be seen as the STFT of the time domain data, depends on the type of the window and stride size, it might exhibit extreme low magnitude data, which makes a traditional minimum follower estimation of noise floor unsuitable.

Accordingly, as shown in block diagram 550, the following function may be used to determine the noise floor $F_i[k]$:

$$F_i[k] = \begin{cases} \alpha F_i[k-1] + (1-\alpha)|Y_i[k]| & \text{if } |Y_i[k]| \le F_i[k-1] \\ \beta F_i[k-1] + (1-\beta)|Y_i[k]| & \text{otherwise} \end{cases}$$

Here $\alpha$ is a smoothing factor smaller than $\beta$. The idea here is when the microphone input 555 is bigger than the noise floor (e.g., case 565), a larger time constant is used for smoothing in order to restrain the increase of the noise floor. By contrast, when the microphone input 555 is less than the noise floor (e.g., case 570), a smaller time constant may be used. The value of $\alpha$ and $\beta$ may be predetermined constants chosen based on the stride size and window of the STFT used to generate the frequency domain signals. This may be to make sure that for normal speech, the noise floor would not track to the speech level, and for non-speech frames, the floor won't go quickly to the very low value of $Y_i[k]$ 555 which is not representative of the noise at all. The noise floor may then be transmitted to the function 580 for determining correlation coefficients $\rho_i[k]$ 585, where it may be used to improve robustness of the control logic of the AEC. For example, by only choosing bins where the noise floor is low, as shown in FIG. 4, a smaller angle variation between the signal y[t] and $\hat{x}$[t] will result better quality of I[k].

Figure 7:
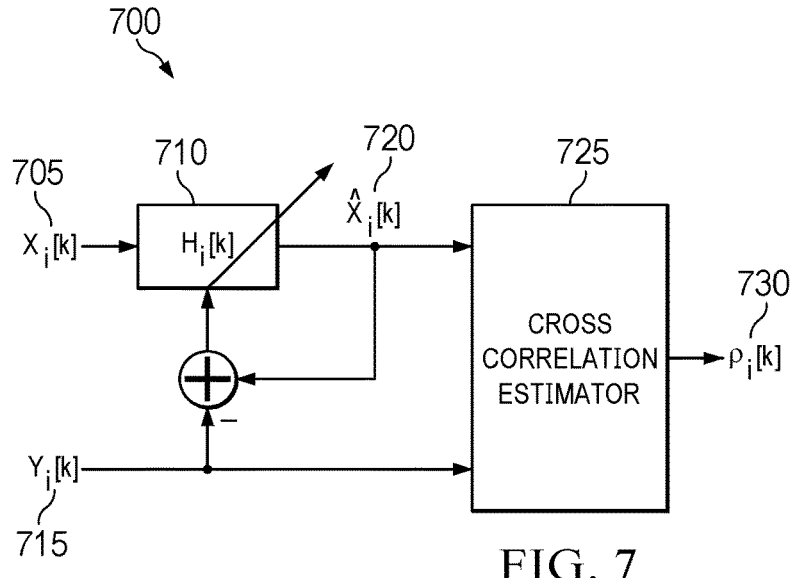
FIG. 7 shows a simplified block diagram of a system for determining correlation coefficients for a deviation signal, according to various embodiments.

FIG. 6 shows a flow diagram for a method 600 of determining a deviation signal, which may be used to halt adaptation of the background filter 240 according to an embodiment. At optional step 605, noise floor values for each frequency bin may be determined as described above. Cross-correlation coefficients for both the foreground echo estimation and the background echo estimation for each frequency bin of the received frequency-domain far end signal may be determined at step 610. Each cross-correlation coefficient may be based on a comparison of received microphone input signals and the respective echo estimations by the filters for each frequency bin. FIG. 7 shows an exemplary simplified block diagram 700 describing generation of the cross-correlation coefficients for each filter 710. The far-end signal $X_i[k]$ 705 may be processed by the filter 710 to output the echo estimate $\hat{X}_i[k]$ 720, as described above. Cross-correlation estimator 725 may compare the echo estimate $\hat{X}_i[k]$ 720 with the microphone input $Y_i[k]$ to determine the cross-correlation $\rho_i[R]$ 730. In an exemplary embodiment, the cross-correlation for the i-th bin may be determined using the following formula:

$$\rho_i[k] = \frac{Y_i[k] \cdot \hat{X}_i[k]}{|Y_i[k]| \cdot |\hat{X}_i[k]|}.$$

At optional step 615, the cross-correlation coefficients may be filtered to use determined values only for bins that meet a threshold level of speech. In an exemplary embodiment, two separate tests will make sure only $\rho_i[k]$ of bins with significant speech are calculated. The first one is the SNR test, namely, the level of speech should surpass a certain level above the noise floor. (to reduce the effect of input noise) and the second one is absolute level test: the level of input should be alone big enough (to reduce the numerical error). Mathematically, this may be expressed as:

$$\rho_i[k] = \begin{cases} 1.0 & \text{when } \dfrac{|Y_i[k]|}{F_i[k]} \le SNR_0 \text{ or } |Y_i[k]| \le L_0 \\ \dfrac{Y_i[k] \cdot \hat{X}_i[k]}{|Y_i[k]| \cdot |\hat{X}_i[k]|} & \text{otherwise} \end{cases},$$

where SNR0 and L0 are predefined thresholds.

The determined cross-correlation coefficients may be added across a plurality of the frequency bins for both the foreground echo estimation and the background echo estimation at step 620. The cross-correlation coefficients are calculated for each bin from i0 to i1 for each frame and for both the foreground echo estimation and the background echo estimation. The input to the hysteresis function, namely, the accumulation of the cross-correlation coefficients is chosen between foreground accumulation and background accumulation based on which filter output is chosen to output E[k] as described above. The control logic may determine which echo estimation between the foreground and background filter to use for the current frame (as described with regard to step 130 of method 100), and a signal may indicate which echo estimate is selected. This signal may be used to select the sum of correlation coefficients associated with the filter associated with the selected echo estimate.

Figure 8:
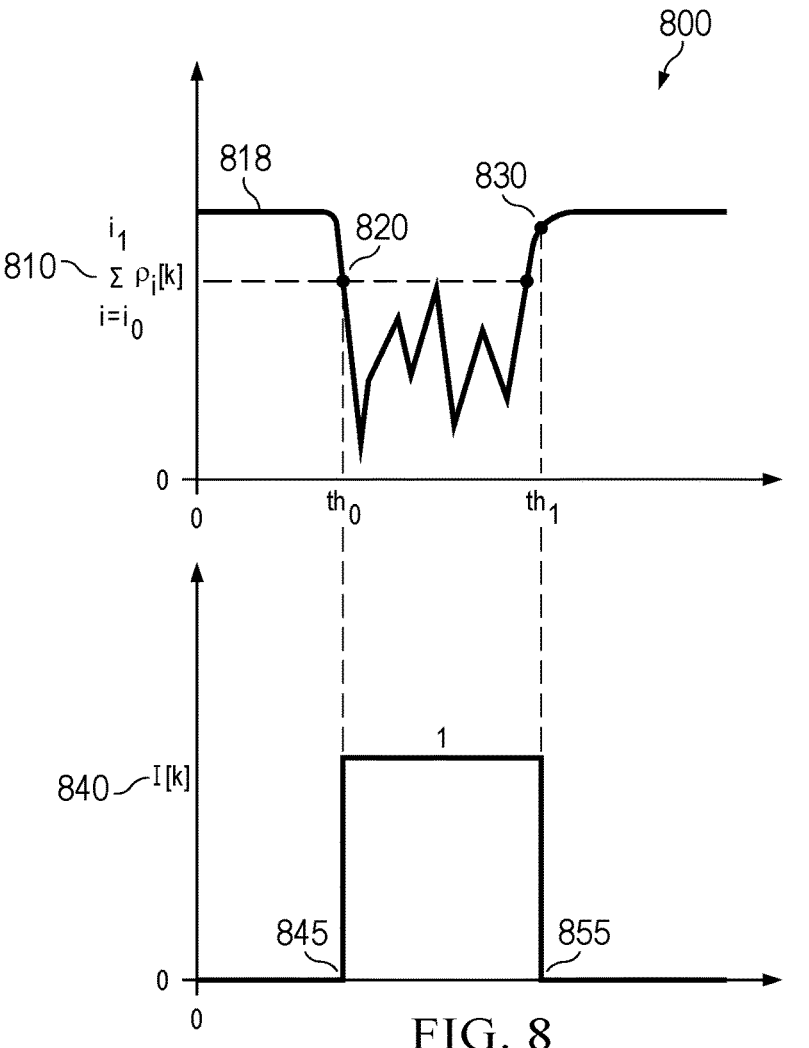
FIG. 8 shows a hysteresis function as applied to a deviation signal according to an embodiment.

Finally. a hysteresis function may be applied to the selected sum of cross-correlation coefficients at step 640. FIG. 8 illustrates a plot of an exemplary binary hysteresis function as applied to the sum of the correlation coefficients $$\sum_{i=i_o}^{i_1} \rho_i[k]$$

818. When the selected sum 818 is less than a first threshold $th_0$ 820, the hysteresis function I[k] may output a high value (e.g. at time point 845). When the selected sum 818 is greater than a second threshold $th_1$ 830, the hysteresis function I[k] 840 may output a low value (e.g., at time point 855). As shown in FIG. 8, the second threshold $th_1$ 830 may be set higher than the first threshold $th_0$ 820, to help reduce excessive switching in some embodiments. The deviation signal being activated by the control logic in response to the hysteresis function outputting the high value, which the control logic uses to turn off adaptation by the background filter.

Whenever the deviation signal is high (I[k] is 1), the background filter stops updating. For echo path change scenario, this allows foreground filter to continue update to the new speaker-room-mic response, and the error of the background filter will be larger than the foreground, this allows the control logic to copy the newly adapted foreground filter to the background. While for the double talk case, because foreground filter continues to update during local speech presented frames, it will diverge from the real speaker-room-mic response, and the foreground error will be larger than the background filter, which allows the control logic to replace the foreground filter with the frozen background filter.

A robust deviation signal will greatly help the control logic to freeze background filter without losing the ability to quickly update foreground filter whenever echo path changes. This enhancement enables the AEC to achieve a better and more consistent performance in different environment.

Figure 9:
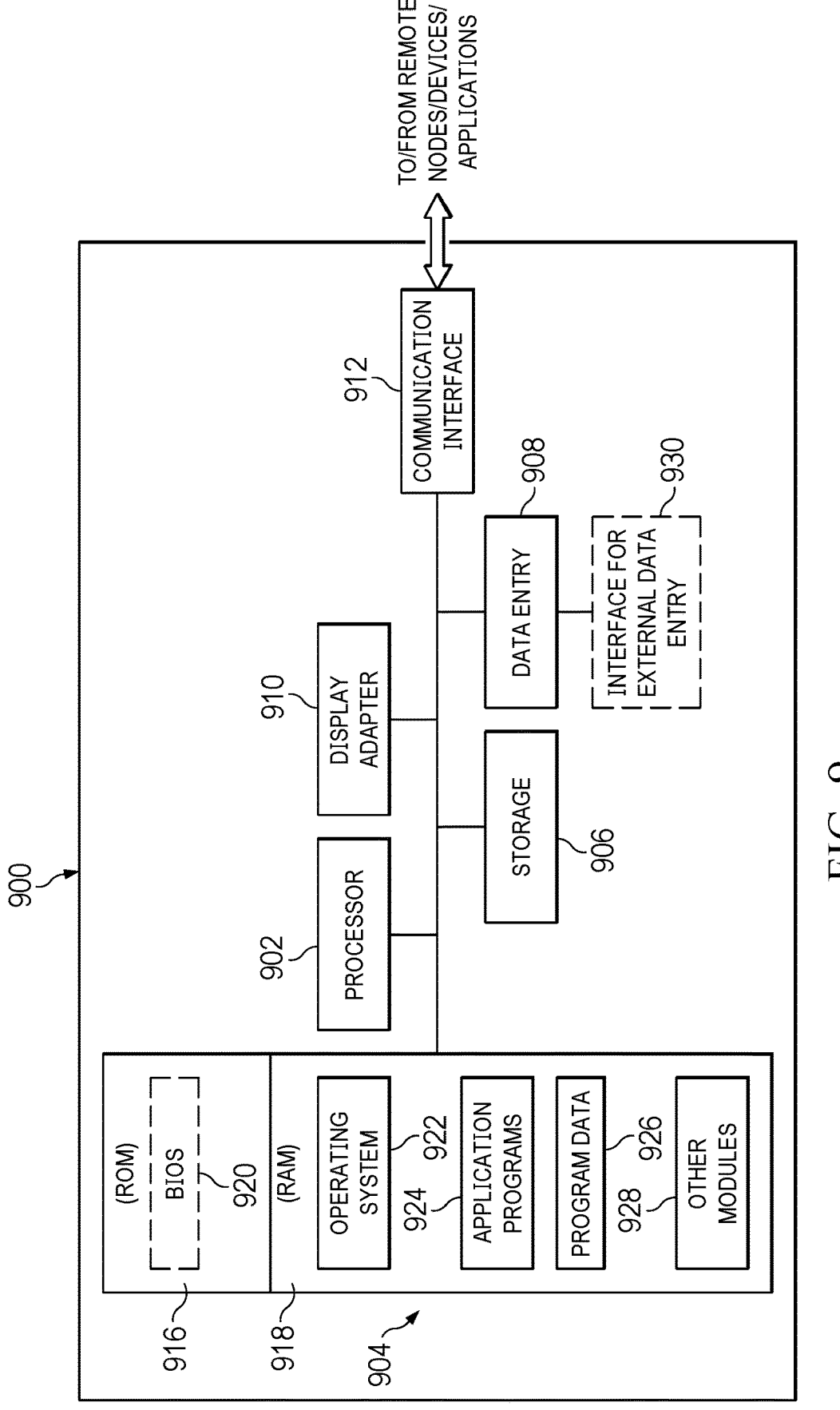
FIG. 9 is a block diagram of an exemplary system for controlling foreground and background adaptive filtering components of an acoustic echo cancelling system, according to an embodiment.

The methods and modules described above may be implemented using hardware or software running on a computing system. FIG. 9 is a block diagram of an exemplary computing system for concealing packet loss in a multi-format voice communication system, according to various embodiments of the present invention. With reference to FIG. 9, an exemplary system for implementing the subject matter disclosed herein, including the methods described above, includes a hardware device 900, including a processing unit 902, memory 904, storage 906, data entry module 908, display adapter 910, communication interface 912, and a bus 914 that couples elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in memory 904 and/or storage 906 and/or received via data entry module 908.

The memory 904 may include read only memory (ROM) 916 and random access memory (RAM) 918. Memory 904 may be configured to store program instructions and data during operation of device 900. In various embodiments, memory 904 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 904 may also include nonvolatile memory technologies such as nonvolatile flash RAM (NVRAM) or ROM. In some embodiments, it is contemplated that memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, ROM 916 or RAM 918, including an operating system 922, one or more applications programs 924, program data 926, and other program modules 928. A user may enter commands and information into the hardware device 900 through data entry module 908. Data entry module 908 may include mechanisms such as a keyboard, a touch screen, a pointing device, etc. Other external input devices (not shown) are connected to the hardware device 900 via external data entry interface 930. By way of example and not limitation, external input devices may include a microphone, joystick, game pad, satellite dish, scanner, or the like. In some embodiments, external input devices may include video or audio input devices such as a video camera, a still camera, etc. Data entry module 908 may be configured to receive input from one or more users of device 900 and to deliver such input to processing unit 902 and/or memory 904 via bus 914.

The hardware device 900 may operate in a networked environment using logical connections to one or more remote nodes (not shown) via communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 912 may include logic configured to support direct memory access (DMA) transfers between memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of hardware device 900 illustrated in FIG. 9 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 900. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Various aspects of the present invention may be appreciated from the following enumerated example embodiments (EEEs):

EEE1: A method for controlling foreground and background adaptive filtering components of an acoustic echo cancelling system, the method comprising:

filtering, by a foreground filter in communication with control logic, a received frequency-domain far end signal, the filtering by the foreground filter resulting in a foreground echo estimation, the foreground filter being an adaptive echo cancellation filter that operates based on foreground coefficients:

filtering, by a background filter in communication with the control logic, the received frequency-domain far end signal, the filtering by the background filter resulting in a background echo estimation, the background filter being an adaptive echo cancellation filter that operates based on background coefficients:

determining a filtered result, by the control logic, based on a near-end microphone signal and a selected one of the foreground echo estimation and the background echo estimation, the filtered result being subsequently used to generate a near-end voice signal; and halting, by the control logic, adaptation by the background filter based on a deviation signal, the deviation signal being determined by the control logic based on:

determining a cross-correlation coefficient for both the foreground echo estimation and the background echo estimation for each frequency bin of the received frequency-domain far end signal, each cross-correlation coefficient being based on a comparison of received microphone input signals and the respective echo estimations of each frequency bin;

adding the determined cross-correlation coefficients across a plurality of the frequency bins for both the foreground echo estimation and the background echo estimation; and selecting one of the sum of the cross-correlation coefficients for the foreground echo estimation and the sum of the cross-correlation coefficients for the background echo estimation, the selecting being based on the filter associated with the selected one of the echo estimations;

applying a hysteresis function to the selected sum of cross-correlation coefficients, such that when the selected sum is greater than a first threshold, the hysteresis function outputs a high value, and when the selected sum is less than a second threshold, the hysteresis function outputs a low value, the deviation signal being active in response to the hysteresis function outputting the high value.

EEE2: The method of EEE1, where received near-end microphone signals are, prior to the determining of the cross-correlation coefficients, processed to determine a noise floor value for each frequency bin, the noise floor being used to determine the cross-correlation coefficients for each bin.

EEE3: The method of EEE2, the processing to determine the noise floor value being based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

EEE4: The method of EEE3, wherein first smoothing factor is a lower value than the second smoothing value.

EEE5: The method of any of EEEs 1-4, the deviation signal being further determined based on filtering determined cross-correlation coefficients such that cross-correlation coefficients are determined for only bins with greater than a threshold level of speech, and bins with less than the threshold level of speech have cross-correlation coefficients set to a predetermined value.

EEE6: The method of EEE5, the threshold level of speech being based on a comparison of a magnitude of the near-end microphone signal to a noise floor value for a bin being greater than a predetermined signal-to-noise ratio threshold.

EEE7: The method of EEE5, the threshold level of speech being based on a magnitude of the near-end microphone signal being greater than a predetermined minimum level threshold.

EEE8: The method of any of EEEs 1-7, the adding the determined cross-correlation coefficients across the plurality of frequency bins comprising adding determined cross-correlation coefficients for frequency bins within the 300 Hz to 3400 Hz range.

EEE9: A computer program product comprising computer-readable program code to be executed by one or more processors when retrieved from a non-transitory computer-readable medium, the program code including instructions to:

filter, by a foreground filter, a received frequency-domain far end signal, the filtering by the foreground filter resulting in a foreground echo estimation, the foreground filter being an adaptive echo cancellation filter that operates based on foreground coefficients:

filter, by a background filter, the received frequency-domain far end signal, the filtering by the background filter resulting in a background echo estimation, the background filter being an adaptive echo cancellation filter that operates based on background coefficients:

determine a filtered result based on a near-end microphone signal and a selected one of the foreground echo estimation and the background echo estimation, the filtered result being subsequently used to generate a near-end voice signal; and halt adaptation by the background filter based on a deviation signal, the deviation signal being determined based on:

determining a cross-correlation coefficient for both the foreground echo estimation and the background echo estimation for each frequency bin of the received frequency-domain far end signal, each cross-correlation coefficient being based on a comparison of received microphone input signals and the respective echo estimations of each frequency bin:

adding the determined cross-correlation coefficients across a plurality of the frequency bins for both the foreground echo estimation and the background echo estimation; and selecting one of the sum of the cross-correlation coefficients for the foreground echo estimation and the sum of the cross-correlation coefficients for the background echo estimation, the selecting being based on the filter associated with the selected one of the echo estimations:

applying a hysteresis function to the selected sum of cross-correlation coefficients, such that when the selected sum is greater than a first threshold, the hysteresis function outputs a high value, and when the selected sum is less than a second threshold, the hysteresis function outputs a low value, the deviation signal being active in response to the hysteresis function outputting the high value.

EEE10: The computer program product of EEE9, where received near-end microphone signals are, prior to the determining of the cross-correlation coefficients, processed to determine a noise floor value for each frequency bin, the noise floor being used to determine the cross-correlation coefficients for each bin.

EEE11: The computer program product of EEE10, the processing to determine the noise floor value being based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

EEE12: The computer program product of EEE11, wherein first smoothing factor is a lower value than the second smoothing value.

EEE13: The computer program product of any of EEEs 9-12, the deviation signal being further determined based on filtering determined cross-correlation coefficients such that cross-correlation coefficients are determined for only bins with greater than a threshold level of speech, and bins with less than the threshold level of speech have cross-correlation coefficients set to a predetermined value.

EEE14: The computer program product of EEE13, the threshold level of speech being based on a comparison of a magnitude of the near-end microphone signal to a noise floor value for a bin being greater than a predetermined signal-to-noise ratio threshold.

EEE15: The computer program product of EEE14, the threshold level of speech being based on a magnitude of the near-end microphone signal being greater than a predetermined minimum level threshold.

EEE16: The computer program product of any of EEEs 9-15, the adding the determined cross-correlation coefficients across the plurality of frequency bins comprising adding determined cross-correlation coefficients for frequency bins within the 300 Hz to 3400 Hz range.

EEE17: An acoustic echo cancelling system comprising:

a foreground filter that filters a received frequency-domain far end signal, the filtering by the foreground filter resulting in a foreground echo estimation, the foreground filter being an adaptive echo cancellation filter that operates based on foreground coefficients:

a background filter that filters the received frequency-domain far end signal, the filtering by the background filter resulting in a background echo estimation, the background filter being an adaptive echo cancellation filter that operates based on background coefficients; and control logic in communication with each of the foreground filter and the background filter, the control logic:

determining a filtered result based on a near-end microphone signal and a selected one of the foreground echo estimation and the background echo estimation, the filtered result being subsequently used to generate a near-end voice signal; and halting adaptation by the background filter based on a deviation signal, the deviation signal being determined by the control logic based on:

determining a cross-correlation coefficient for both the foreground echo estimation and the background echo estimation for each frequency bin of the received frequency-domain far end signal, each cross-correlation coefficient being based on a comparison of received microphone input signals and the respective echo estimations of each frequency bin:

adding the determined cross-correlation coefficients across a plurality of the frequency bins for both the foreground echo estimation and the background echo estimation; and selecting one of the sum of the cross-correlation coefficients for the foreground echo estimation and the sum of the cross-correlation coefficients for the background echo estimation, the selecting being based on the filter associated with the selected one of the echo estimations:

applying a hysteresis function to the selected sum of cross-correlation coefficients, such that when the selected sum is greater than a first threshold, the hysteresis function outputs a high value, and when the selected sum is less than a second threshold, the hysteresis function outputs a low value, the deviation signal being active in response to the hysteresis function outputting the high value.

EEE18: The system of EEE17, where received near-end microphone signals are, prior to the determining of the cross-correlation coefficients, processed to determine a noise floor value for each frequency bin, the noise floor being used to determine the cross-correlation coefficients for each bin.

EEE19: The system of EEE18, the processing to determine the noise floor value being based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

EEE20: The system of EEE19, wherein the first smoothing factor is a lower value than the second smoothing value.

The invention claimed is:

1. A method for controlling foreground and background adaptive filtering components of an acoustic echo cancelling system, the method comprising:

filtering, by a foreground filter in communication with control logic, a received frequency-domain far end signal, the filtering by the foreground filter resulting in a foreground echo estimation, the foreground filter being an adaptive echo cancellation filter that operates based on foreground coefficients;

filtering, by a background filter in communication with the control logic, the received frequency-domain far end signal, the filtering by the background filter resulting in a background echo estimation, the background filter being an adaptive echo cancellation filter that operates based on background coefficients;

determining a filtered result, by the control logic, based on a near-end microphone signal and a selected one of the foreground echo estimation and the background echo estimation, the filtered result being subsequently used to generate a near-end voice signal, wherein the control logic is configured to select one of the foreground echo estimation and the background echo estimation based on a comparison of a difference between the near-end microphone signal and the foreground echo estimation and a difference between the near-end microphone signal and the background echo estimation; and freezing, by the control logic, values of coefficients used in the background filter when a deviation signal is at a logical high, wherein determining the deviation signal by the control logic comprises:

determining a respective cross-correlation coefficient for both the foreground echo estimation and the background echo estimation for each frequency bin of the received frequency-domain far end signal, each cross-correlation coefficient being based on a comparison of received microphone input signals and respective echo estimations of each frequency bin;

summing the determined cross-correlation coefficients across a plurality of the frequency bins for each of the foreground echo estimation and the background echo estimation;

selecting one of the sum of the cross-correlation coefficients for the foreground echo estimation and the sum of the cross-correlation coefficients for the background echo estimation, wherein the selected sum corresponds to the selected one of the foreground echo estimation and the background echo estimation; and applying a hysteresis function to the selected sum of cross-correlation coefficients, such that when the selected sum is less than a first threshold, the hysteresis function outputs a high value representing the logical high, and when the selected sum is greater than a second threshold, the hysteresis function outputs a low value.

2. The method of claim 1, wherein received near-end microphone signals are, prior to the determining of the respective cross-correlation coefficients, processed to determine a respective noise floor value for each frequency bin, the respective noise floor being used to determine the cross-correlation coefficients for each bin.

3. The method of claim 2, wherein the processing to determine the respective noise floor value is based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

4. The method of claim 3, wherein the first smoothing factor has a lower value than the second smoothing value.

5. The method of claim 1, wherein the deviation signal is determined further based on filtering the determined respective cross-correlation coefficients such that cross-correlation coefficients are determined only for bins with greater than a threshold level of speech, and wherein bins with less than the threshold level of speech have cross-correlation coefficients set to a predetermined value.

6. The method of claim 5, wherein the threshold level of speech is based on a comparison of a magnitude of the near-end microphone signal to a noise floor value for a bin being greater than a predetermined signal-to-noise ratio threshold.

7. The method of claim 5, wherein the threshold level of speech is based on a magnitude of the near-end microphone signal being greater than a predetermined minimum level threshold.

8. The method of claim 1, wherein the summing the determined cross-correlation coefficients across the plurality of frequency bins comprises adding determined cross-correlation coefficients for frequency bins within a 300 Hz to 3400 Hz range.

9. A non-transitory computer-readable medium storing instructions that, when executed by one or more processors, cause the one or more processors to perform operations comprising:

filtering, by a foreground filter, a received frequency-domain far end signal, the filtering by the foreground filter resulting in a foreground echo estimation, the foreground filter being an adaptive echo cancellation filter that operates based on foreground coefficients;

filtering, by a background filter, the received frequency-domain far end signal, the filtering by the background filter resulting in a background echo estimation, the background filter being an adaptive echo cancellation filter that operates based on background coefficients;

determining a filtered result based on a near-end microphone signal and a selected one of the foreground echo estimation and the background echo estimation, the filtered result being subsequently used to generate a near-end voice signal, wherein the one or more processors are configured to select one of the foreground echo estimation and the background echo estimation based on a comparison of a difference between the near-end microphone signal and the foreground echo estimation and a difference between the near-end microphone signal and the background echo estimation; and freezing values of coefficients used in the background filter when a deviation signal is at a logical high, wherein determining the deviation signal comprises:

determining a respective cross-correlation coefficient for both the foreground echo estimation and the background echo estimation for each frequency bin of the received frequency-domain far end signal, each cross-correlation coefficient being based on a comparison of received microphone input signals and respective echo estimations of each frequency bin;

summing the determined cross-correlation coefficients across a plurality of the frequency bins for each of the foreground echo estimation and the background echo estimation;

selecting one of the sum of the cross-correlation coefficients for the foreground echo estimation and the sum of the cross-correlation coefficients for the background echo estimation, wherein the selected sum corresponds to the selected one of the foreground echo estimation and the background echo estimation; and applying a hysteresis function to the selected sum of cross-correlation coefficients, such that when the selected sum is less than a first threshold, the hysteresis function outputs a high value representing the logical high, and when the selected sum is greater than a second threshold, the hysteresis function outputs a low value.

10. The non-transitory computer-readable medium of claim 9, wherein, in the operations, received near-end microphone signals are, prior to the determining of the respective cross-correlation coefficients, processed to determine a respective noise floor value for each frequency bin, the respective noise floor being used to determine the cross-correlation coefficients for each bin.

11. The non-transitory computer-readable medium of claim 10, wherein, in the operations, the processing to determine the respective noise floor value is based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

12. The non-transitory computer-readable medium of claim 11, wherein, in the operations, the first smoothing factor has a lower value than the second smoothing value.

13. The non-transitory computer-readable medium of claim 9, wherein, in the operations, the deviation signal is determined further based on filtering determined cross-correlation coefficients such that cross-correlation coefficients are determined only for bins with greater than a threshold level of speech, and wherein bins with less than the threshold level of speech have cross-correlation coefficients set to a predetermined value.

14. The non-transitory computer-readable medium of claim 13, wherein, in the operations, the threshold level of speech is based on a comparison of a magnitude of the near-end microphone signal to a noise floor value for a bin being greater than a predetermined signal-to-noise ratio threshold.

15. The non-transitory computer-readable medium of claim 14, wherein, in the operations, the threshold level of speech is based on a magnitude of the near-end microphone signal being greater than a predetermined minimum level threshold.

16. The non-transitory computer-readable medium of claim 9, wherein, in the operations, the summing the determined cross-correlation coefficients across the plurality of frequency bins comprises adding determined cross-correlation coefficients for frequency bins within a 300 Hz to 3400 Hz range.

17. An acoustic echo cancelling system, comprising:

a foreground filter that filters a received frequency-domain far end signal, the filtering by the foreground filter resulting in a foreground echo estimation, the foreground filter being an adaptive echo cancellation filter that operates based on foreground coefficients;

a background filter that filters the received frequency-domain far end signal, the filtering by the background filter resulting in a background echo estimation, the background filter being an adaptive echo cancellation filter that operates based on background coefficients; and control logic in communication with each of the foreground filter and the background filter, the control logic being configured for:

determining a filtered result based on a near-end microphone signal and a selected one of the foreground echo estimation and the background echo estimation, the filtered result being subsequently used to generate a near-end voice signal, wherein the control logic is configured to select one of the foreground echo estimation and the background echo estimation based on a comparison of a difference between the near-end microphone signal and the foreground echo estimation and a difference between the near-end microphone signal and the background echo estimation; and freezing values of coefficients used in the background filter when a deviation signal is at a logical high, wherein determining the deviation signal by the control logic comprises:

determining a respective cross-correlation coefficient for both the foreground echo estimation and the background echo estimation for each frequency bin of the received frequency-domain far end signal, each cross-correlation coefficient being based on a comparison of received microphone input signals and the respective echo estimations of each frequency bin;

summing the determined cross-correlation coefficients across a plurality of the frequency bins for each of the foreground echo estimation and the background echo estimation;

selecting one of the sum of the cross-correlation coefficients for the foreground echo estimation and the sum of the cross-correlation coefficients for the background echo estimation, wherein the selected sum corresponds to the selected one of the foreground echo estimation and the background echo estimation; and applying a hysteresis function to the selected sum of cross-correlation coefficients, such that when the selected sum is less than a first threshold, the hysteresis function outputs a high value representing the logical high, and when the selected sum is greater than a second threshold, the hysteresis function outputs a low value.

18. The system of claim 17, wherein received near-end microphone signals are, prior to the determining of the respective cross-correlation coefficients, processed to determine a respective noise floor value for each frequency bin, the respective noise floor being used to determine the cross-correlation coefficients for each bin.

19. The system of claim 18, wherein the processing to determine the noise floor value is based on:

a first smoothing factor and a noise floor value for a preceding bin when a magnitude of the near-end microphone signal is less than or equal to a modified near-end microphone signal for the preceding bin; and a second smoothing factor and the noise floor value for the preceding bin when the magnitude of the near-end microphone signal is greater than the modified near-end microphone signal for the preceding bin.

20. The system of claim 19, wherein the first smoothing factor has a lower value than the second smoothing value.

* * * * *